Dec. 17, 1940.  A. MUSSARI  2,225,377
COLLET FOR MACHINE TOOLS
Filed March 14, 1939  2 Sheets-Sheet 1
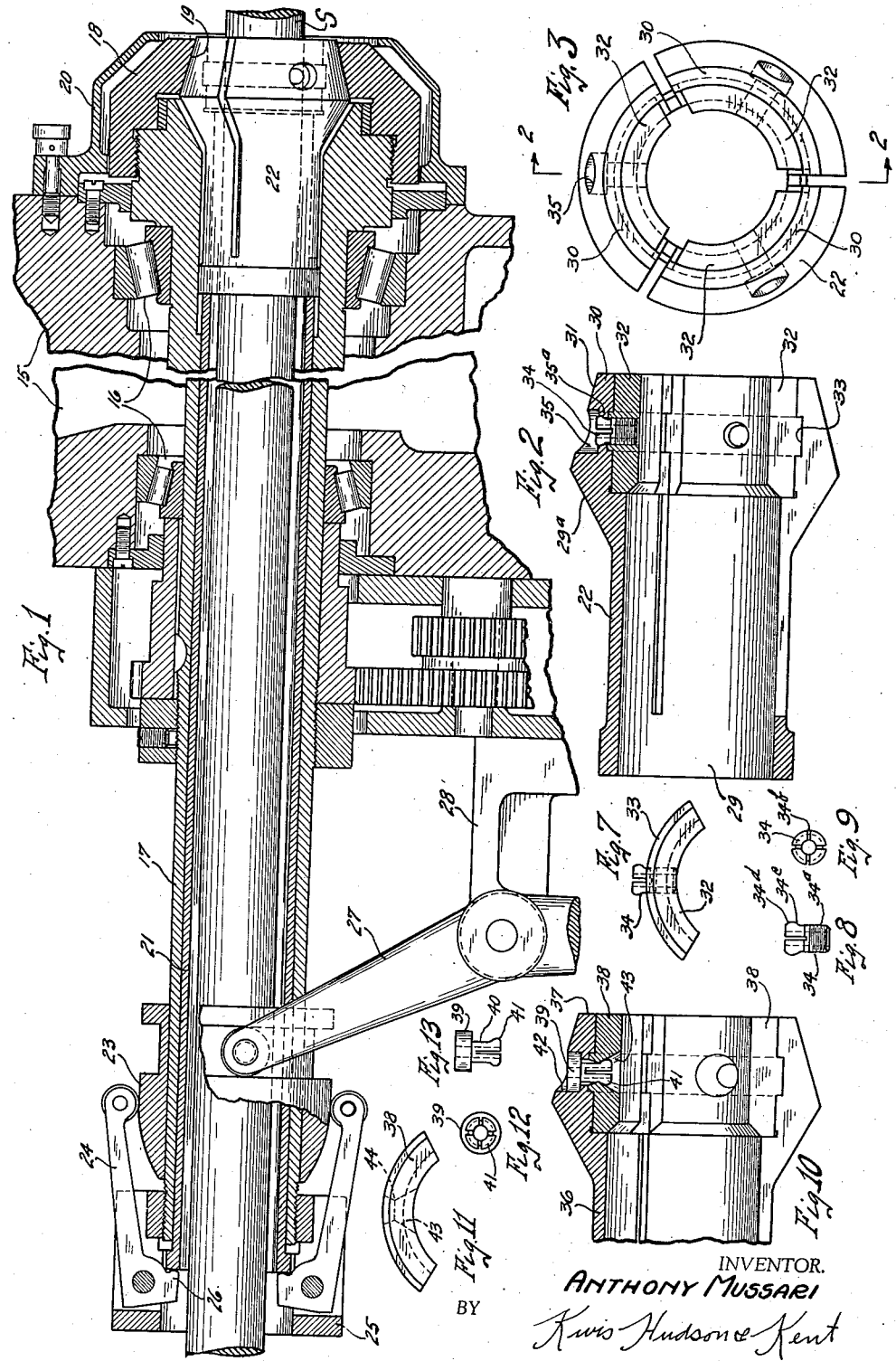
INVENTOR.
ANTHONY MUSSARI
BY
Kwis Hudson & Kent
ATTORNEYS Dec. 17, 1940.                A. MUSSARI                2,225,377
                       COLLET FOR MACHINE TOOLS
                       Filed March 14, 1939         2 Sheets-Sheet 2
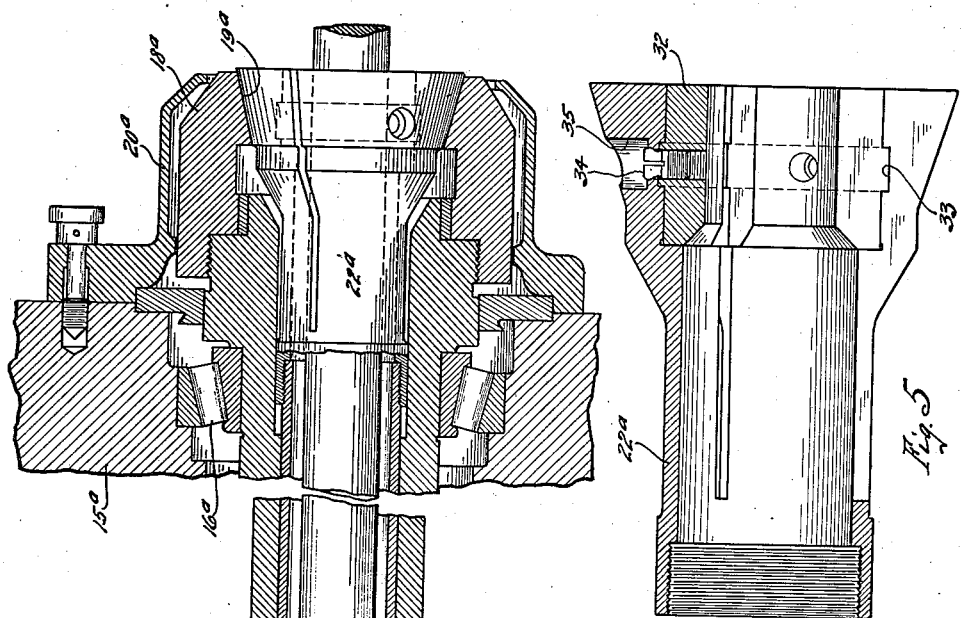
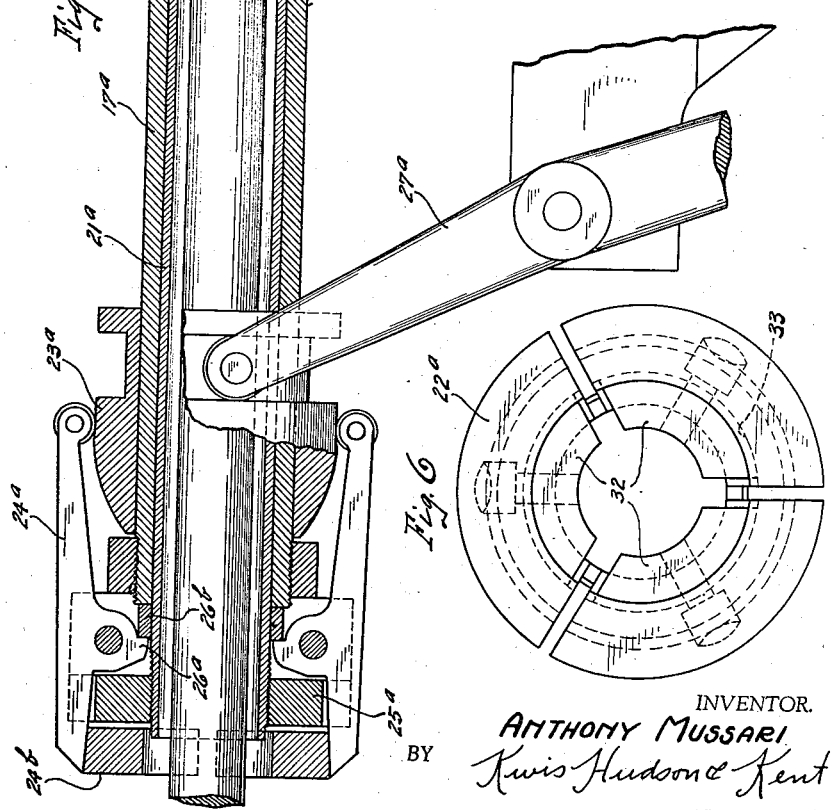
INVENTOR.
ANTHONY MUSSARI
BY Kwis Hudson & Kent
ATTORNEYS Patented Dec. 17, 1940

2,225,377

UNITED STATES PATENT OFFICE 2,225,377

COLLET FOR MACHINE TOOLS

Anthony Mussari, Erie, Pa., assignor to The Warner & Swasey Company, Cleveland, Ohio, a corporation of Ohio Application March 14, 1939, Serial No. 261,715

2 Claims. (Cl. 279—51)

This invention relates to collets and particularly to collets which are used in certain types of machines, such as screw machines and lathes, wherein bar stock of various sizes and shapes is fed through a hollow spindle.

In machines of the general type mentioned above, there is located in the hollow spindle a so-called collet which is adapted to grip the bar stock and hold it stationary while the portion of the stock which projects beyond the spindle is being operated on by the tool or tools, and later to release the stock so as to permit it to be fed forwardly for the next operation or cycle of operations to be performed by the tool or tools. Such a collet is usually formed from a tubular member slotted to provide flexible spring jaws to the inner faces of which are secured pads which are adapted to engage the stock.

The outer faces of the collet jaws are tapered, and there is provided on the forward end of the spindle a so-called hood having a conical opening through which the stock is adapted to project. The conical or tapered face of this opening is adapted to engage tapered faces of the jaws and to cam them inwardly to bring the pads into gripping relation with the stock, the collet being designed to be moved axially of the spindle so as to bring the tapered faces of the jaws into or out of camming relation with the tapered face of the hood. It is moved in one direction to cause the collet pads to engage the stock and in the opposite direction so that the jaws may spring outwardly and release the stock. In some machines the collet is moved forwardly when the pads are to grip the work, in which case the collet is termed a push-out collet, while in other machines the collet is moved rearwardly for this purpose and in such machines the collet is known as a pull-back collet.

The hood referred to is at the front of the headstock and is mounted on an enlarged forwardly projecting portion of the spindle with the camming surface which is adapted to cooperate with the tapered forward ends of the collet jaws carefully centralized with respect to the axis of the spindle. Generally, as a safety factor or safety element, the hood is surrounded by a cover which is fastened to the front end of the headstock in which the hollow spindle is journaled.

As stated above, bar stock of various sizes and shapes is designed to be operated upon and fed through the hollow spindle. For each size or shape of stock a given set of collet pads is employed. Each time the size or shape of the stock is changed it is necessary that the collet pads be removed and replaced with another set of pads which are thicker or thinner, depending upon whether the stock is changed from a smaller to a larger size, or which have their inner faces suitably contoured for the new shape of stock if the shape of the stock is varied.

The changing of the pads for the purposes mentioned above is time-consuming since it is necessary to remove the guard from the headstock and then remove the hood from the spindle so as to expose the forward end of the collet. Usually the pads are secured to the inner faces of the forward ends of the collet jaws by screws, and these pad securing screws must be removed one at a time. After new pads have been secured to the collet jaws it is necessary to replace the hood on the spindle and then replace the guard on the headstock.

The principal object of the present invention is to facilitate the application or removal of the collet pads and to so secure the pads to the collet jaws that the pads may be removed and very readily replaced with others without the necessity of removing the guard and hood or disturbing the collet and without the necessity of manipulating screws or equivalent means to fasten the pads to the collet jaws or to remove them.

A further object is to provide a collet which embodies to a high degree the features of efficiency and economy in the respects that the pads can be quickly removed or applied, and when applied are effectively held in place with the result that the collet functions as an efficient element in gripping and holding the work and in releasing it to permit the bar stock to be fed forwardly through the spindle.

Briefly stated, the invention comprises the use of snap fasteners of the flexing spring finger type instead of screws to secure the pads to the collet jaws, these snap fasteners being operable to secure or release the pads from the front end or nose of the collet lying within the hood, thus avoiding the necessity of disturbing or changing the positions of the collet hood and guard when the snap fasteners are actuated in changing pads.

A single snap fastener is preferably utilized to secure a pad to the jaw and to release it therefrom, this snap fastener being preferably radially disposed substantially centrally with respect to the sides and the ends of the pad.

The invention may be further briefly summarized as consisting in certain novel details of construction and combinations and arrangements of parts which will be described in the specification and set forth in the appended claims.

In the accompanying sheets of drawings,

Fig. 1 is a fragmentary vertical sectional view through a portion of a machine tool equipped with my improved collet, part of the machine tool being broken away, the machine tool here shown being such as to employ a collet of the push-out type;

Fig. 2 is a longitudinal sectional view of the collet removed from the machine tool, the section being taken substantially along the line 2—2 of Fig. 3;

Fig. 3 is an end view of the collet shown in Fig. 2 looking toward the left of Fig. 2;

Fig. 4 is a view similar to Fig. 1 with the machine tool utilizing a collet of the pull-back type;

Fig. 5 is a view similar to Fig. 2 showing the pull-back collet of Fig. 4;

Fig. 6 is an end view similar to Fig. 3 showing the collet of Fig. 5;

Fig. 7 is a detached end view of the pad utilized in the collet of the preceding views;

Figs. 8 and 9 are respectively a side view and an end view of the snap fastener utilized in the collets of the preceding views;

Fig. 10 is a view similar to Fig. 2 showing, however, only the forward portion of the collet and illustrating a modified form of snap fastener for detachably securing the pad to the collet jaw;

Fig. 11 is a view similar to Fig. 7 showing the pad formed to accommodate the snap fastener of Fig. 10; and Figs. 12 and 13 are views similar to Figs. 8 and 9 respectively showing the modified form of snap fastener illustrated in Fig. 10.

Before describing my improved collet, brief reference will be made to the other elements of the machine tool shown in Figs. 1 and 4.

In Fig. 1 portions of the headstock are shown at 15 this headstock supporting by anti-friction bearings 16 the hollow work spindle 17. It will be noted that the forward end of the spindle is somewhat enlarged and projects beyond the front face of the headstock in the standard and well known manner. Screwed onto the forward portion of the spindle which projects beyond the headstock is a hood 18 having a conical opening with a tapered inner face 19 for camming the jaws of the collet inwardly to work engaging position. Surrounding the hood is a guard 20 which is adapted to be secured in the usual manner to the front face of the headstock. Inside of the spindle 17 is a collet shifting sleeve 21 which rotates with the spindle but is freely movable in an endwise direction therein. The forward end of the sleeve 21 is in abutting relation with the rear end of the collet which is shown at 22, this collet being of the push-out type. The work is, in this instance, in the form of round bar stock designated S extending through the spindle 17, sleeve 21 and collet 22. When the sleeve is moved forwardly it pushes the collet forwardly so that the outer tapered faces of the collet jaws (to be referred to presently) engage and are cammed inwardly by the tapered inner face 19 of the hood, and when the endwise pressure on the sleeve 21 is relieved, the effect of the spring tension imposed in the jaws and on the engaging tapered faces of the hood and jaws is such as to move the collet rearwardly and at the same time move the sleeve 21 in the same direction.

The usual way of moving the sleeve forwardly is illustrated in Fig. 1 which shows the rear end of the spindle surrounded by a cone 23, the cone being engaged by fingers 24 of a shifter including a holder 25 which is screwed onto the extreme rear end of the spindle 17. The inner ends of the fingers are provided with abutments 26 which when the outer ends of the fingers are cammed outwardly by the cone engage a shouldered portion at the rear end of the sleeve 21 and move it forwardly and when the cone is withdrawn from the outer ends of the fingers, the pressure of the tapered surfaces of the collet jaws on the tapered face of the hood moves the collet inwardly and restores the sleeve to its previous position. The cone is adapted to be shifted by a lever 27 which may be manually or otherwise operated. The lever is shown as mounted on a bracket 28 mounted on a portion of the gear box containing the feed gears which do not concern the present invention and need not be described in detail.

As stated above the portion of the machine tool illustrated in Fig. 1 utilizes a collet of the push-out type. On the other hand, the portion of the machine tool illustrated in Fig. 4 utilizes a collet of the pull-back type. In this figure the headstock is designated 15a and the hollow work spindle 17a, the same being journaled in the headstock as before by anti-friction bearings 16a, only the forward bearing being here shown. Secured to the forward end of the spindle as before is a hood 18a which in this instance has an inner tapered face 19a tapered in the reverse direction from that illustrated in Fig. 1. The hood is surrounded by a guard 20a secured to the headstock as before.

In the hollow spindle is a collet shifting sleeve 21a the forward end of this sleeve being in this instance screwed into the threaded rear end of the collet which is designated 22a. To cause the collet pads to grip the bar stock S the collet is pulled back by rearward movement imparted to the sleeve 21a. In this instance the holder for the sleeve shifter here designated 25a is screwed onto the rear end of the sleeve 21a beyond the rear end of the spindle, and this holder carries fingers 24a the outer ends of which are adapted to be spread apart by a cone 23a mounted as before on the spindle and shiftable by a lever 27a. In this instance the rear ends of the fingers 24a are counterweighted as shown at 24b so that the forward ends of the fingers will normally tend to move inwardly by centrifugal force. In this construction the abutments 26a of the fingers 24a engage a ring 26b which abuts against the rear end of the spindle. Accordingly, when the cone 23a is moved to the left or to the position shown in Fig. 4, so as to spread the fingers 24a, the abutments 26a press against the ring 26b which in turn press against the spindle 17a, and the effect of this is to move the holder for the fingers and therefore the sleeve 21a and the collet 22a rearwardly, thus moving the collet jaws inwardly to work engaging position. When the cone is moved to the right to become free of the fingers 24a, the effect of the spring or tension in the collet jaws and the engagement of their outer tapered faces with the tapered surface of the hood 18a is to move the collet and sleeve forwardly and thus release the bar stock.

Referring now to the construction of the collet illustrated in Figs. 2, 3, 7, 8 and 9, the collet 22 comprises a body portion in the form of a tubular member 29 with an enlarged forward end 29a and slotted from its forward end rearwardly to near its rear end forming fingers or jaws 30. The collet body is usually formed from heat-treated steel so that the jaws 30 have considerable resilience or spring in order that they can be pressed inwardly by the hood to work gripping position and when released will again spring outwardly to normal position and thus release the work so that it can be fed through the spindle. It is to be noted that the outer faces of the jaws are tapered as shown at 31 to conform to the tapered surface 19 of the hood for the purpose previously explained.

In this instance the forward end of the collet body 29 is counterbored to form a clearance for the collet pads 32 each of which is in the form of an arc-shaped member generally made of hardened steel. In this instance the collet has three spring jaws and therefore accommodates three of the collet pads 32 and, as herein illustrated, the inner surfaces of the pads are arcs of circles to accommodate round bar stock S. However, it is to be understood that the number of jaws and therefore the number of pads provided on the collet may be varied as desired, and if stock other than round stock is fed through the spindle, the inner faces of the pads will be shaped accordingly so that the collet will in all instances be capable of effectively gripping the stock regardless of its contour and size. It will be understood that pads of different thicknesses are required for stock of different sizes, a thicker pad being required for stock of small size, and vice versa.

Suitable means is provided on the engaging surfaces of the pads and collet jaws to prevent endwise movement of the pads on the jaws and to center them or cause them to seat squarely thereon. This is accomplished in this instance by providing substantially midway between the inner and outer ends of the pads a tongue and groove interfitting connection between the pads and the inner surfaces of the jaws. In this instance the pads are provided on their outer faces with arc-shaped square-cut ribs 33 which fit closely into correspondingly shaped grooves on the inner faces of the jaws. However, the arrangement of the ribs and grooves may be reversed, i. e., the grooves may be cut on the outer faces of the pads and the inner faces of the jaws may be provided with the ribs to fit the grooves of the pads.

Additionally, in this instance the inner ends of the pads bear against a shoulder formed by the counterbore, but I do not regard the use of abutting faces at this point as essential as the tongue and groove interfitting parts adequately serve the purposes mentioned, but the shoulder formed by the counterbore may be used to advantage in aligning or centering the pads when they are being placed in the jaws of the collet.

To detachably secure the pads to the collet in a manner such that they can be either placed in position or removed without disturbing the collet, the hood, and the guard, in other words, to accomplish the objects of the invention stated in the early part of the specification, I secure the pads in place by the use of snap fasteners, one such snap fastener of the contractible type being preferably employed for each pad, this fastener being preferably arranged centrally of the ends and centrally of the side edges of the pad and being radially disposed, as clearly shown in Figs. 2 and 7. In this instance the snap fasteners are carried by the pads and they are adapted to snap into suitably shaped openings formed in the collet jaws but this arrangement may be reversed, i. e., the snap fasteners may be carried by the jaws and the pads may be provided with suitably formed openings so that the heads of the fasteners may snap into suitably shaped openings in the pads.

In the construction illustrated in Figs. 1 to 9, the snap fasteners are in the form of tubular members 34, preferably formed from heat treated steel, each having a threaded shank 34a which is screwed into a threaded socket of one of the members, in this instance, the pad. The threaded shank is in this instance formed on about one-half the length of the tubular member and the remainder is slotted as shown at 34b, thereby forming spring fingers 34c. The end of the slotted portion of the tubular member is enlarged or formed into a resilient head 34d composed of rounded shoulders at the free ends of the finger 34c.

Each collet jaw is provided with an opening 35, and at the base of the opening a beveled shoulder 35a is provided so formed that when the pad is inserted in the collet and pressed outwardly, the slotted protruding end of the fastener is pressed up in the narrow part of the opening 35 and as the rounded resilient head 34d passes the shoulder 35a the fingers spring outwardly or expand so that the pad is effectively held in position but can be readily detached from the jaw by prying the pad away from the jaw, as by inserting a suitable tool between their engaging surfaces. This can be done from the front of the machine without disturbing the collet, the hood, or the guard, as previously noted.

It should be noted that in the construction illustrated in Figs. 1 to 9 the opening of the pad which receives the threaded end of the snap fastener extends through the arc-shaped rib 33 and the opening provided in the jaw to receive the protruding spring end of the fastener extends through the base of the groove which receives the rib.

With the pull-back collet illustrated in Figs. 4, 5 and 6 identically the same manner of fastening the pads to the collet jaws may be employed as with the push-out collet first described and in fact in Figs. 4, 5 and 6 the method in which the pads of the pull-back collet are seated in the jaws and are detachably fastened thereto is precisely the same as with the push-out collet first described and, therefore, further description of this part and manner of utilizing my invention need not be described in detail in connection with Figs. 4, 5 and 6 and the corresponding parts of the two constructions are given identical reference characters. I wish to point out, however, that the same ease of applying and removal of the pads while the collet is in the machine applies equally well to the collets of the pull-back type as to collets of the push-out type and to machines which are constructed to accommodate the two types of collets.

Furthermore inasmuch as I utilize a snap fastener which is preferably located substantially centrally of the pad and substantially centrally of the pad receiving surface of the jaw, my invention can be applied with equal advantage to either type of collet, notwithstanding the fact that with the push-out collet the extreme front end of the collet jaws is, due to the tapered surface 31, relatively thin, as will be seen by Fig. 2, and may be considerably thinner than illustrated in this figure if the collet is designed to accommodate stock of larger diameter than herein illustrated. In other words, with the collet pads detachably secured to the jaws in accordance with my invention, the latter is equally adapted for all types of collets and with collets whose jaws and pads are adapted to accommodate stock of widely varying sizes and shapes.

With the form of my invention illustrated in Figs. 10 to 13 the construction of the collect including the jaws and the pads may be, and preferably is identical with the constructions first described, except for the form of the snap fasteners and the openings which are provided in the jaws and pads to accommodate the fasteners, it being understood that with the construction illustrated in Figs. 10 to 13, each pad is secured to the inner face of the jaw by a single substantially centrally disposed snap fastener which will now be described. Therefore although the type of fastener illustrated in Figs. 10 to 13 may be utilized with either the push-out or pull-back types of collets, I have shown in Fig. 10 a push-out type of collet 36 with the jaws 37 and the pads 38 formed and shaped as in the similar type of collet illustrated in Figs. 1, 2 and 3.

The snap fastener of Figs. 12 and 13 is a tubular member which may be made from heat treated steel. It is provided at one end with a head 39 and a reduced shank which is slotted to form spring fingers 40 with a resilient rounded head 41 formed at the free end of the slotted portion or shank. In this instance each jaw has an opening 42 formed therein to accommodate the head 39 of the fastener, and near its inner end the opening is reduced in size to form a shoulder on which the head 39 may rest and to permit the passage therethrough of the slotted shank portion 40. Formed centrally through the pad is an opening 43 with its end portions oppositely tapered forming an internal shoulder 44 which, in this instance, is somewhat nearer the curved outer face of the pad than the curved inner face. The shape of the opening 43 and the location of the reduced part or shoulder 44 are such that when the pads are applied the slotted yielding shank 40 of the fastener is inserted into the opening 43 of the pad and when the resilient rounded head 41 of the fastener passes the internal shoulder 44 at the reduced part of the opening 43 in the pad, it is compressed and then springs outwardly and serves to effectively hold the pad in position. Here again by insertion of a suitable tool between the engaging surfaces of the pad and jaw the pad can be separated from and removed from the jaw.

If desired or found necessary the head 39 of the fastener may be given any suitable shape or held in the opening 42 of the jaw in any desired or convenient manner to hold the fastener in place in the jaw while the pad is being applied or removed.

It will be understood, of course, that with the type of snap fasteners illustrated in Figs. 10 to 13 the pads can be removed or applied without the necessity of disturbing the collet hood or guard precisely as with the constructions first described.

In machine tools of the type utilizing a stock gripping collet the stock may be fed through the spindle either manually or automatically, and in the latter case a feed collet is employed, which for the sake of simplicity I have not attempted to illustrate in Figs. 1 and 4.

While I have described and illustrated my invention as being applied to a stock gripping collet, it may be employed to advantage in other types of collets as, for example, a feed collet in machine tools of the general type herein illustrated and referred to in the specification.

While I have shown several forms of my invention I do not desire to be confined to the precise details or arrangements illustrated and described, but aim in my claims to cover all modifications which do not involve a departure from the spirit and scope of the invention.

Having thus described my invention, I claim:

1. In a collet comprising a tubular member having spring jaws, and pads on the inner faces of said jaws, means for securing each pad to the associated jaw comprising a resilient snap fastener of the contractible type carried by one member and engaging the other.

2. In a collet comprising a tubular member having spring jaws, and pads on the inner faces of said jaws, means for securing each pad to the associated jaw comprising a snap fastener of the flexing spring finger type carried by one member and engaging the other.

ANTHONY MUSSARI.